United States Patent
Alger, II et al.

(10) Patent No.: US 7,389,752 B2
(45) Date of Patent: Jun. 24, 2008

(54) USE OF ENGINE LUBRICANT AS IGNITION FUEL FOR MICRO-PILOT IGNITION SYSTEM OF AN INTERNAL COMBUSTION ENGINE

(75) Inventors: Terrence F. Alger, II, San Antonio, TX (US); Jess W. Gingrich, San Antonio, TX (US); Stephen F. Hahne, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 51 days.

(21) Appl. No.: 11/456,416

(22) Filed: Jul. 10, 2006

(65) Prior Publication Data

US 2007/0023002 A1     Feb. 1, 2007

Related U.S. Application Data

(60) Provisional application No. 60/698,382, filed on Jul. 12, 2005.

(51) Int. Cl.
*F02B 19/14* (2006.01)
*F02B 47/00* (2006.01)

(52) U.S. Cl. .................. 123/1 A; 123/275; 123/299; 123/304

(58) Field of Classification Search ............. 123/27 GE, 123/299, 300, 304, 525, 1 A, 275, 294
See application file for complete search history.

(56) References Cited

U.S. PATENT DOCUMENTS

| | | |
|---|---|---|
| 2,580,572 A * | 1/1952 | McMillan ............... 123/41.42 |
| 3,929,645 A | 12/1975 | Bugleski ................. 210/251 |
| 4,421,078 A | 12/1983 | Hurner .................. 123/196 |
| 4,440,115 A | 4/1984 | Allen ..................... 123/1 |
| 4,495,909 A | 1/1985 | Hurner .................. 123/196 |
| 4,730,580 A | 3/1988 | Matsushita ............. 123/73 |
| 4,869,346 A | 9/1989 | Nelson .................. 184/1.5 |
| 5,431,138 A | 7/1995 | Hurner .................. 123/196 |
| 5,870,978 A | 2/1999 | Willi et al. ............. 123/27 GE |
| 5,887,566 A * | 3/1999 | Glauber et al. ......... 123/27 GE |
| 6,079,380 A | 6/2000 | Jorgensen et al. ...... 123/73 |
| 6,209,511 B1 | 4/2001 | Goto et al. ............. 123/256 |
| 6,491,016 B1 * | 12/2002 | Buratti .................. 123/299 |
| 6,516,756 B1 | 2/2003 | Kato et al. ............. 123/73 |
| 6,543,394 B2 | 4/2003 | Tinney .................. 123/1 |
| 6,598,584 B2 * | 7/2003 | Beck et al. ............. 123/299 |
| 7,007,661 B2 * | 3/2006 | Warlick ................. 123/27 GE |
| 7,036,482 B2 * | 5/2006 | Beck et al. ............. 123/300 |

FOREIGN PATENT DOCUMENTS

EP     0943788     9/1999

* cited by examiner

*Primary Examiner*—T. M. Argenbright
(74) *Attorney, Agent, or Firm*—Baker Botts LLP

(57) ABSTRACT

A method and system for providing pilot fuel for a pilot ignition system of an internal combustion engine having one or more cylinders and having a lubrication system. A portion of the lubricating oil is diverted from the lubricating system. During the pilot ignition phase of the engine combustion cycle, the diverted lubricating oil is injected into the one or more cylinders.

28 Claims, 2 Drawing Sheets

USE OF ENGINE LUBRICANT AS IGNITION FUEL FOR MICRO-PILOT IGNITION SYSTEM OF AN INTERNAL COMBUSTION ENGINE

CROSS-REFERENCE TO RELATED APPLICATIONS

This application claims the benefit of U.S. Provisional Application No. 60/698,382 filed on Jul. 12, 2005, which is incorporated herein by reference in its entirety.

TECHNICAL FIELD OF THE INVENTION

This invention relates to internal combustion engines, and more particularly to ignition systems for such engines.

BACKGROUND OF THE INVENTION

In an internal combustion engine, the "ignition system" is the mechanism that ignites the fuel consumed by the engine. Most engines use either an electrical or a compression heating ignition system. Electrical spark ignition systems rely on a battery and an induction coil to provide an electrical spark to ignite the air-fuel mix in the engine's cylinders. Compression heating ignition systems inject fuel into the engine's cylinders and rely on the heat created in the air by compression in the cylinders to ignite the fuel.

Today's engines must meet the demands of government regulations and consumers for low emissions and high fuel economy. One approach to satisfying these demands is the use of a highly dilute pre-mixed fuel for ignition. However, in the case of spark ignition systems, only a limited amount of dilution is tolerable before misfire and unstable operation occur.

To overcome this shortcoming of spark ignition systems, "pilot" ignition systems have been developed. A small quantity of liquid fuel is injected into a pre-combustion chamber to allow high energy self-ignition. Direct injection pilot ignition systems using diesel fuel have proven to increase the dilution tolerance of both stoichiometric and lean burn engines.

In the case of a non-diesel engine, the use of the diesel-fueled pilot ignition system requires two different fuels for engine operation. Both fuels must be available for re-fueling, and for vehicle engines, both fuels must be carried on-board.

DETAILED DESCRIPTION OF THE INVENTION

The following description is directed to the use of an engine's lubricating oil as the pilot fuel (ignition fuel) for a pilot injection system. This method may be implemented with any internal combustion engine having a pilot ignition system. As explained below, however, the invention is particularly useful for engines running with high EGR (exhaust gas recirculation) rates and high compression ratios at stoichiometric air-fuel ratios.

Pilot ignition systems are "auto-ignition" systems, as compared to "spark ignition" systems. A pilot fuel is introduced into the engine cylinder under pressure, and as the piston compresses the gasses in the cylinder, the pilot fuel auto-ignites. Pilot ignition systems may, in theory be used with any type of internal combustion engine, including but not limited to diesel and gasoline engines, engines using alternative fuels such as hydrogen or natural gas, or electric engines. Pilot ignition systems for internal combustion engines are also sometimes referred to as "micro-pilot" ignition systems, because of the low flow rates.

For purposes of the invention, it is assumed that the engine has a separate lubricating oil system with a reservoir of lubricating oil. This lubricating oil system is "separate" in the sense that the oil is not part of the fuel mix consumed by the engine, such as in the case of a two-stroke engine.

In the example of this description, the engine uses gasoline (petrol) as its primary fuel, and has a lubricating oil system that provides lubricating oil for the engine crankcase. The term "primary fuel" is used herein to distinguish the pilot fuel injected during the pilot ignition phase of the combustion cycle from the fuel consumed during the remainder of the combustion cycle.

Figure 1:
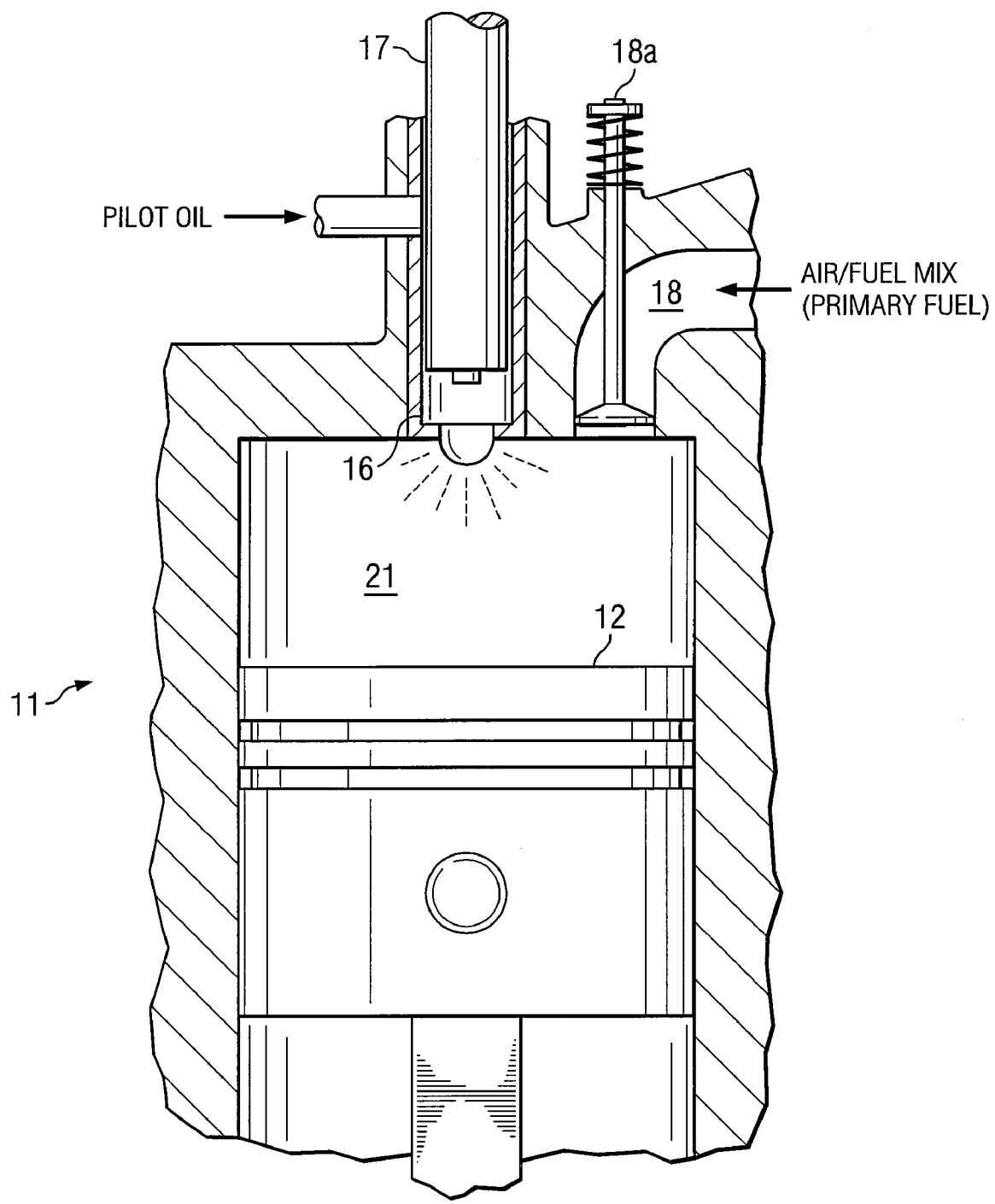
FIG. 1 is a generalized depiction of an engine cylinder having an oil-fueled pilot injection system in accordance with the invention.

FIG. 1 illustrates the top portion of a representative and generalized four-stroke engine cylinder 11. The engine into which cylinder 11 is incorporated may be described as a pre-mixed flame propagation engine. Only those elements significant to the invention are explicitly illustrated; other elements, such as exhaust valves and ports, are not shown.

The cylinder 11 is a bore that has a piston 12 which reciprocates as the engine runs. The cylinder 11 and piston 12 define a combustion chamber 21. In the example of this description, an air-fuel mixture enters the cylinder 11 via port 18, which is opened and closed by valve 18*a*. A pilot fuel injector 17 injects oil into the cylinder 11. The oil injector 17 is fed oil via line 19 from an oil reservoir (not shown). Electronic components known to one of skill in the art are used to monitor and control the various valves and injectors are not shown.

In other embodiments, the pre-mixed primary air-fuel mixture may be introduced by fuel injectors. In any event, a feature of the invention is that the injection of lubricating oil as the pilot fuel is separate from injection of the primary fuel. The lubricating oil is maintained as a fluid separate from the primary fuel until the oil reaches the combustion chamber.

The pilot oil to line 19 may be drawn from any point in the lubricating system. Thus, line 19 is in fluid communication with some point of the lubricating oil path associated with the engine. Typically, the oil will be drawn from a reservoir, such as the oil pan (used oil) or a new oil reservoir (new oil). Typically the ratio (by volume) of oil to gasoline used in the example of this description is from about 0.1:100 to about 10:100, and more typically, is from about 0.1:100 to about 2:100. The oil level is maintained in the engine by refilling the oil reservoir. If the oil is drawn from the oil pan, the method described herein may eliminate the need for oil changes and assist in keeping oil levels high.

In the example of this description, the pilot oil is injected directly into cylinder 11 using a typical direct injection (DI) injector, such as conventional injectors used for diesel fuel in diesel engines. The direct injection may be into a pre-combustion chamber 16 as in the example of FIG. 1 or elsewhere into chamber 21.

A common rail direct (CRD) injection ignition system may also be used in conjunction with lubricating oil as the pilot ignition fuel. CRD injection is conventionally associated with injection of diesel as a primary fuel and isolates the functions of generating pressure and controlling the amount of fuel injected. In a CRD system, a common rail or pipe acts as a shared reservoir of fuel. The fuel is stored in the common rail at a high pressure, which eliminates the need for a build-up of pressure individually at each injector. Connectors from the common rail deliver fuel to each injector. At the end of the injector, a valve regulates the injection timing and the amount of fuel injected, based on inputs from a microprocessor or an electronic control unit (ECU). As in conventional injection systems, once the fuel is injected into the cylinder, compression heats the air to temperatures above the ignition point of the fuel. Most conventional CRD engines also employ a "pilot injection" or "pilot burn". Seconds before the primary fuel is injected into the cylinders, a small amount of diesel is injected. The pilot injection and ignition starts the combustion process even before the main load is injected.

For purposes of the present invention, in an engine equipped with a CRD injection ignition system, lubricating oil is used as the pilot fuel. Multiple injections may be timed and used to control combustion rate shaping. For engines having an emissions control catalyst, a late secondary injection may be used to improve catalyst light off times. A feature of pilot injector 17 is that ignition timing may be precisely controlled.

Figure 2:
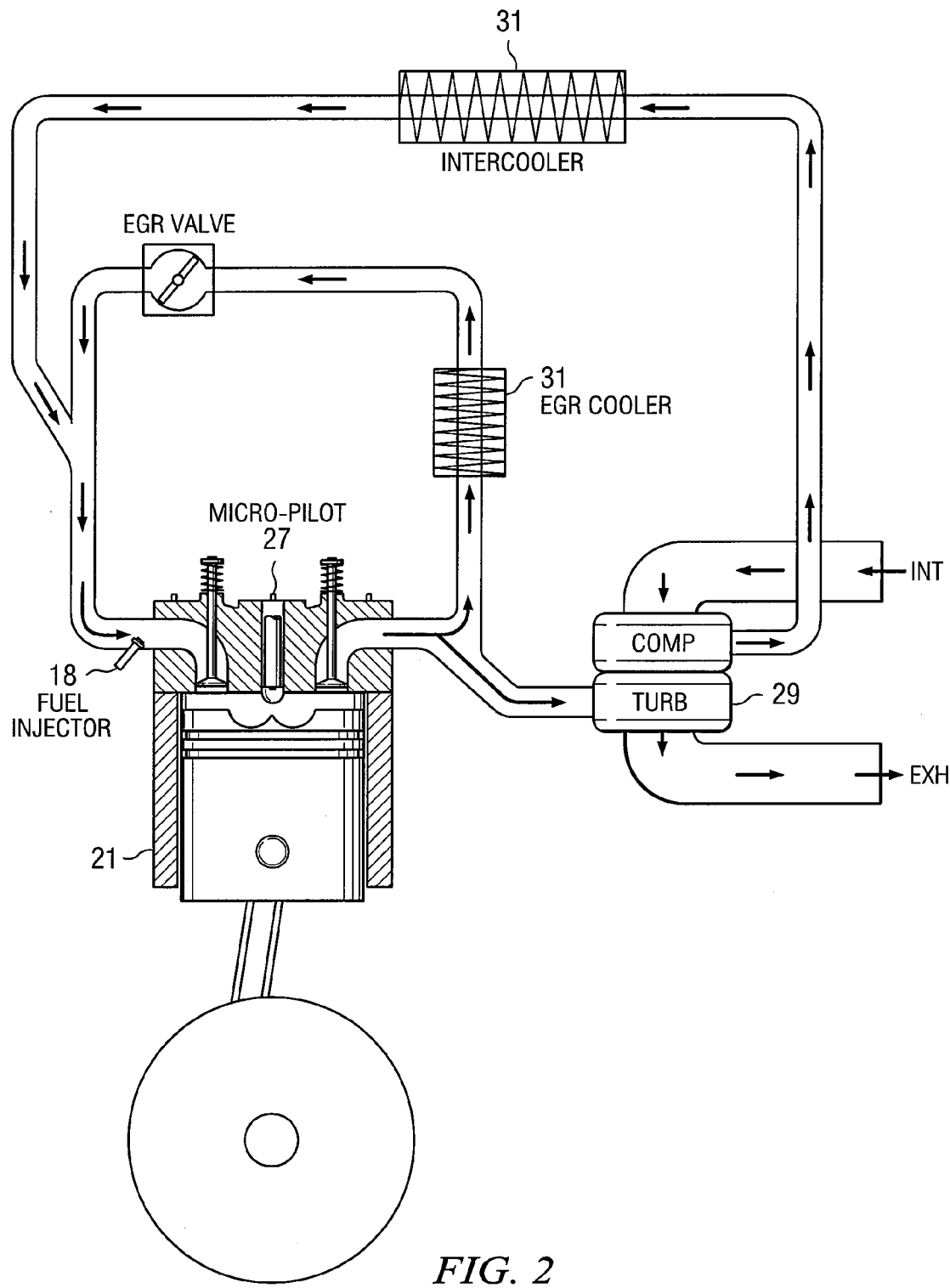
FIG. 2 illustrates the use of an oil-fueled pilot injection system with an engine having EGR.

FIG. 2 illustrates the use of an oil-fueled pilot injection system with an engine having EGR. Only a single cylinder 21 is explicitly shown. A pilot fuel injector 27 receives lubricating oil from elsewhere in the engine system, as described above. It injects the pilot fuel into the cylinder for pilot ignition. The primary fuel is injected using direct fuel injector 18, which may a CDR type injector. In the example of FIG. 2, the primary fuel is gasoline.

The engine is has an air-charger 29, such as a turbocharger. Exhaust gas is recirculated through a high pressure EGR loop, which is routed from the exhaust manifold, then through a cooler, and mixed with intake air before entering the intake manifold. As stated above, the use of oil as the pilot fuel permits high dilution rates. "High" EGR rates are considered to be within a range from 25 to 60 percent.

The lubricating oil is suitable for use as the sole pilot fuel for pre-mixed high dilution engines. It reduces engine-out emissions by increasing the dilution limit of the air-fuel mixture, regardless whether the dilution is by EGR or lean operation. Lubricating oil injected into the combustion chamber 21 ignites readily even when the engine is equipped with an exhaust gas recirculation (EGR) system. The use of lubricating oil as a pilot fuel increases engine efficiency, such as by allowing ignition timing that approaches MBT (maximum brake torque) ignition timing.

The lubricating oil may also be mixed with gasoline or diesel fuel within chamber 21 to provide the pilot ignition fluid. It is also possible to use the lubricating oil as the primary fuel for certain engines and load conditions. For example, lubricating oil is suitable as a primary fuel in an engine capable of HCCI (homogeneous charge combustion ignition) mode during low load conditions.

The lubricating oils used in the present invention can be based on unrefined, refined, or re-refined oils, either natural or synthetic (as well as mixtures of two or more of any of these). Unrefined oils are those obtained directly from a natural or synthetic source without further purification treatment. Refined oils are similar to the unrefined oils except they have been further treated in one or more purification steps to improve one or more properties. Re-refined oils are obtained by processes similar to those used to obtain refined oils applied to refined oils which have been already used in service.

Engine oil having a high cetane number is particularly easy to ignite. Criteria for suitable oils are those that provide a high-energy robust pilot ignition fuel that will speed up the burn rate and improve engine performance.

Examples of oils of lubricating viscosity useful for purposes of the present invention include mineral oils, natural oils such as animal or vegetable oils, and oils derived from coal or shale. Silicon-based oils are but one example of useful synthetic lubricants.

Lubricating oils useful for purposes of the invention may contain additives, such as are present in commercially available lubricating oils for engines. Non-limiting, representative examples of such additives include alcohols, ethers, and organometallic compounds. Experimentation may be performed to determine the effect on ignition of various additives such as detergents, dispersants, supplemental viscosity improvers, oxidation inhibiting agents, corrosion inhibiting agents, pour point depressing agents, extreme pressure agents, anti-wear agents, color stabilizers and anti-foam agents.

The invention claimed is:

1. A method of providing pilot fuel for a pilot ignition system of an internal combustion engine having one or more cylinders, and a lubrication system, and using a primary fuel, comprising:
    obtaining a portion of the lubricating oil from the lubricating system;
    mixing the portion of lubricating oil with a portion of the primary fuel; and
    during the pilot ignition phase of the engine combustion cycle, injecting the mixed portions of lubricating oil and primary fuel into the one or more cylinders.

2. The method of claim 1, wherein the injecting step is performed by direct injection into a pre-combustion chamber.

3. The method of claim 1, wherein the injecting step is performed using a common rail injection system.

4. The method of claim 3, further comprising timing the injecting step to perform multiple injections for combustion rate shaping.

5. The method of claim 1, wherein the lubricating oil has a base oil derived from petroleum.

6. The method of claim 1, wherein the engine has at least one emissions control catalyst, and further comprising the step of controlling the injection step to perform late injection for catalyst light off.

7. The method of claim 1, wherein the obtaining step is performed by obtaining fresh oil from a lubrication oil reservoir.

8. The method of claim 1, wherein the obtaining step is performed by obtaining used oil from an oil pan.

9. The method of claim 1, wherein the engine is a homogenous charge compression ignition type engine.

10. The method of claim 1, further comprising the step of timing pilot ignition such that it is close to maximum brake torque ignition timing.

11. The method of claim 1, further comprising the step of using the lubricating oil as the engine's primary fuel during certain operating conditions.

12. An improved pilot ignition system for an internal combustion engine, the engine having at least one cylinder with a combustion chamber, and the engine using a primary fuel, the improvement comprising:
    at least one pilot injector that is in fluid communication with a lubrication system of the engine and injects lubricating oil into the cylinder; and
    wherein each combustion chamber is operable to receive a portion of the primary fuel for mixing with the lubricating oil prior to ignition.

13. The system of claim 12, wherein the injector performs direct injection into a pre-combustion chamber.

14. The system of claim 12, wherein the pilot injector is part of a common rail injection system.

15. The system of claim 12, wherein the lubricating oil is obtained by obtaining fresh oil from a lubrication oil reservoir.

16. The system of claim 12, wherein the lubricating oil is obtained by obtaining used oil from an oil pan.

17. The system of claim 12, wherein the engine is a homogenous charge compression ignition type engine.

18. A method of providing pilot fuel for a pilot ignition system of an internal combustion engine having one or more cylinders and a lubrication system, and using a primary fuel, comprising:
   obtaining a portion of the lubricating oil from the lubricating system;
   during the pilot ignition phase of the engine combustion cycle, injecting the portion of lubricating oil into the one or more cylinders; and
   using the lubricating oil as the engine's primary fuel during certain engine operating conditions.

19. The method of claim 18, wherein the injecting step is performed by direct injection into a pre-combustion chamber.

20. The method of claim 18, wherein the injecting step is performed using a common rail injection system.

21. The method of claim 18, further comprising timing the injecting step to perform multiple injections for combustion rate shaping.

22. The method of claim 18, wherein the lubricating oil has a base oil derived from petroleum.

23. The method of claim 18, wherein the engine has at least one emissions control catalyst, and further comprising the step of controlling the injection step to perform late injection for catalyst light off.

24. The method of claim 18, wherein the obtaining step is performed by obtaining fresh oil from a lubrication oil reservoir.

25. The method of claim 18, wherein the obtaining step is performed by obtaining used oil from an oil pan.

26. The method of claim 18, wherein the engine is a homogenous charge compression ignition type engine.

27. The method of claim 18, further comprising the step of timing pilot ignition such that it is close to maximum brake torque ignition timing.

28. The method of claim 18, further comprising the step of, prior to the injecting step, of mixing the lubricating oil with the engine's primary fuel.

* * * * *